United States Patent
Wilson, IV et al.

(10) Patent No.: US 7,958,106 B2
(45) Date of Patent: Jun. 7, 2011

(54) SYSTEM AND METHOD FOR DETERMINING CLIENT METADATA USING A DYNAMIC RULES ENGINE

(75) Inventors: Joseph G. Wilson, IV, Roswell, GA (US); Donald J. Locker, Lebanon, PA (US); Arthur G. Dolimpio, Jr., Souderton, PA (US)

(73) Assignee: Tacoda LLC, New York, NY (US)

( * ) Notice: Subject to any disclaimer, the term of this patent is extended or adjusted under 35 U.S.C. 154(b) by 417 days.

(21) Appl. No.: 12/076,174

(22) Filed: Mar. 14, 2008

(65) Prior Publication Data

US 2008/0228791 A1 Sep. 18, 2008

Related U.S. Application Data (60) Provisional application No. 60/906,859, filed on Mar. 14, 2007.

(51) Int. Cl.
*G06F 17/30* (2006.01)
(52) U.S. Cl. .......................................... 707/706; 707/708
(58) Field of Classification Search .................. 707/706, 707/708
See application file for complete search history.

(56) References Cited

U.S. PATENT DOCUMENTS

| | | | | |
|---|---|---|---|---|
| 5,913,215 A * | 6/1999 | Rubinstein et al. ........... 707/708 | | |
| 6,092,074 A * | 7/2000 | Rodkin et al. ................ 715/205 | | |
| 6,338,066 B1 * | 1/2002 | Martin et al. ................. 707/708 | | |
| 6,519,584 B1 * | 2/2003 | Tognazzini et al. ........... 715/769 | | |
| 6,785,670 B1 * | 8/2004 | Chiang et al. ................ 707/706 | | |
| 6,785,688 B2 * | 8/2004 | Abajian et al. ............... 707/700 | | |
| 6,944,612 B2 * | 9/2005 | Roustant et al. .............. 707/706 | | |
| 7,039,625 B2 * | 5/2006 | Kim et al. .................... 707/706 | | |
| 7,058,625 B2 * | 6/2006 | Bossemeyer et al. .......... 707/706 | | |
| 7,099,881 B2 * | 8/2006 | Richardson et al. .......... 707/693 | | |
| 7,133,864 B2 * | 11/2006 | Roth ............................ 707/708 | | |
| 7,162,481 B2 * | 1/2007 | Richardson et al. .......... 707/693 | | |
| 2006/0265283 A1 * | 11/2006 | Gorodyansky ................. 705/14 | | |
| 2010/0114705 A1 * | 5/2010 | Hoyle ........................ 705/14.54 | | |

* cited by examiner

*Primary Examiner* — Don Wong
*Assistant Examiner* — Kim T Nguyen
(74) *Attorney, Agent, or Firm* — David R. Yohannan; Kelley Drye & Warren LLP (57) ABSTRACT

A system and method for determining client metadata using a dynamic rules engine is disclosed. The system may include a universal data agent, a site management tool, a targeting engine, an ad server, and a data warehouse. When a visitor visits a site on a content delivery system, the universal data agent and targeting engine may collect data about the visitor and site. The site management tool may configure the universal data agent and provided current rules for the dynamic rules engine. The collected data may be stored in the data warehouse and evaluated in the dynamic rules engine to produce a content category. The ad server may use the content category to serve targeted ads and/or other content to the visitor.

20 Claims, 12 Drawing Sheets

| | | | |
|---|---|---|---|
| MANAGE USERS | 10 | /EDUC | CONTAINS | EDUCATION:REFERENCE |
| MANAGE USER ROLES | 11 | /COMPUT | CONTAINS | TECHNOLOGY: GENERAL |
| MANAGE SLFMASTERS | 12 | /CAREERS | CONTAINS | CAREER: GENERAL |
| IMPORT SITES FROM TAN | 13 | /YOGA | CONTAINS | HEALTH:FITNESS |
| PUSH MULTI-SITE SLFS | 14 | /XBOX | CONTAINS | ENTERTAINMENT:GAMES: GENERAL |
| MANAGE SITES | 15 | /WORLDFILM | CONTAINS | ENTERTAINMENT:MOVIES:INDEPENDENT |
| EDIT CONFIG | 16 | /WOODWORKING | CONTAINS | RECREATION: GENERAL |
| EDIT MYPROFILE | 17 | /WOMENSHIST | CONTAINS | COMMUNITY:WOMEN |
| AUDIT MAPPING | 18 | /WOMENSHEA | CONTAINS | HEALTH:WOMENS |
| MANAGE CUSTOM FUNCTIONS | 19 | /WIRELESS | CONTAINS | TECHNOLOGY:HOMEOFFICE:WI-FI&NETWORKING |
| EDIT ORIGINS | 20 | /WINE | CONTAINS | HOME:FOOD:WINE |
| VALIDATE MAPPED CCS | 21 | /WINDOWS | CONTAINS | TECHNOLOGY:COMPUTERS:SOFTWARE |
| MANAGE AUDIENCE ACCESS | 22 | /WEIGHTLO | CONTAINS | HEALTH:FITNESS |
| MANAGE GROUP SLF MASTERS | 23 | /WEDDI | CONTAINS | HOME:FAMILY:WEDDING |
| MANAGE SITE GROUPS | 24 | /WEB | CONTAINS | TECHNOLOGY: GENERAL |
| | 25 | /WEATH | CONTAINS | NEWS:WEATHER |
| | 26 | /WATERSKI | CONTAINS | RECREATION:ACTION: GENERAL |
| | 27 | /WALKING | CONTAINS | HEALTH:GENERAL |
| SLF IS OK | 28 | /VOLLEYB | CONTAINS | RECREATION:ACTION: GENERAL |
| | 29 | /VISUALBA | CONTAINS | TECHNOLOGY:COMPUTERS:SOFTWARE |
| | 30 | /VGSTRATEGIES | CONTAINS | TECHNOLOGY:CORPORATE:STRATEGY |
| | 31 | /VETMED | CONTAINS | HOME:FAMILY:PETS: GENERAL |

| ID: 13259 NAME: KELLEY BLUE BOOK (US) | | | | | | |
|---|---|---|---|---|---|---|
| SITE SUPPORT REP: | | | AMS: ☐ | AUDIT TRAFFIC: ☐ | SIF DATE: | 0000-00-00 |
| | | | TAN DP: ☑ | VALIDATE TRAFFIC: ☐ | TAGS SENT DATE: | 0000-00-00 |
| COMMENTS: | | | TAN IP: ☑ FORCE DATA COLLECTION: ☐ | | TAGS LIVE DATE: | 0000-00-00 |
| | | LAST UPDATED: 2008-02-21 10:49:08 | | BY CRAUCH | | |

SLF-JS CONFIGURATION

ACTIVE VERSION: 3.10  WHEN PUSHED: 2008/02/11 13:36:16  WHO PUSHED: CRAUCH  VERSION: 3.10  ☑ AUTO-PUSH: ☐

[UPDATE ACTIVE SLF] [SLF PRE-CHECK] [PULL ACTIVE SLF] [TEST SLF] [TEST SLF (COMPRESSED)]

CC LOOKUPS (358) ENABLE DYNAMIC CC LOOKUP: ☑  [UPLOAD CC LOOKUPS] [GET UPLOAD TEMPLATE] [MAKE CC LOOKUP XLS] [SET CC FREQUENCY]

VARIABLE NAME TO MATCH: SAFEVARCLEAN('S_PROP17')+SAFEVARCLEAN('S_PROP3')SAFE  DEFAULT CC: AUTOBUYER:_GENERAL ☑

☐ EDIT CC LOOKUPS

SA LOOKUPS (0) ENABLED DYNAMIC SA LOOKUP: ☐

MISCELLANEOUS VARIABLES

| VARIABLE PURPOSE | POSSIBLE VALUES | DEFAULT VALUE | SITE'S VALUE |
|---|---|---|---|

VARIABLE NAME TO MATCH: SAFEVARCLEAN('S_PROP7')+SAFEVARCLEAN('S_PROP3')SAFE   DEFAULT CC: AUTOBUYER:_GENERAL

DYNAMIC CC LOOKUP CONFIG

| ORDER | VALUE | OPERATOR | CURRENT CATEGORY | EDIT |
|---|---|---|---|---|
| 0 | USED-VOLVO-V | CONTAINS | AUTOBUYER:USED:PASSENGER:LUXURY | X |
| 1 | USED-VOLVO-S | CONTAINS | AUTOBUYER:USED:PASSENGER:LUXURY | X |
| 2 | USED-VOLKSWAGEN-PA | CONTAINS | AUTOBUYER:USED:PASSENGER:MIDSIZE:_GENERAL | X |
| 3 | USED-VOLKSWAGEN-J | CONTAINS | AUTOBUYER:USED:PASSENGER:COMPACT | X |
| 4 | USED-VOLKSWAGEN-GT | CONTAINS | AUTOBUYER:USED:SPORTS:2DOOR | X |
| 5 | USED-VOLKSWAGEN-GOLF | CONTAINS | AUTOBUYER:USED:PASSENGER:COMPACT | X |
| 6 | USED-VOLKSWAGEN-C | CONTAINS | AUTOBUYER:USED:PASSENGER:COMPACT | X |
| 7 | USED-TOYOTA-TU | CONTAINS | AUTOBUYER:USED:TRUCKS:FULLSIZE | X |
| 8 | USED-TOYOTA-TE | CONTAINS | AUTOBUYER:USED:PASSENGER:COMPACT | X |
| 9 | USED-TOYOTA-TA | CONTAINS | AUTOBUYER:USED:TRUCKS:COMPACT | X |
| 10 | USED-TOYOTA-SU | CONTAINS | AUTOBUYER:USED:SPORTS:2DOOR | X |
| 11 | USED-TOYOTA-SI | CONTAINS | AUTOBUYER:USED:PASSENGER:VANS:MINIVAN | X |
| 12 | USED-TOYOTA-SE | CONTAINS | AUTOBUYER:USED:PASSENGER:SUV:FULLSIZE | X |
| 13 | USED-TOYOTA-R | CONTAINS | AUTOBUYER:USED:PASSENGER:SUV:COMPACT | X |
| 14 | USED-TOYOTA-PRL | CONTAINS | AUTOBUYER:USED:PASSENGER:HYBRID | X |
| 15 | USED-TOYOTA-PI | CONTAINS | AUTOBUYER:USED:TRUCKS:_GENERAL | X |
| 16 | USED-TOYOTA-L | CONTAINS | AUTOBUYER:USED:PASSENGER:SUV:FULLSIZE | X |
| 17 | USED-TOYOTA-HI | CONTAINS | AUTOBUYER:USED:PASSENGER:SUV:MIDSIZE | X |

SYSTEM AND METHOD FOR DETERMINING CLIENT METADATA USING A DYNAMIC RULES ENGINE

CROSS-REFERENCE TO RELATED APPLICATIONS

The present application relates to, and claims the priority of, U.S. Provisional Patent Application Ser. No. 60/906,859 filed Mar. 14, 2007, which is entitled "System and Method for Determining Client Metadata using a Dynamic Rules Engine."

FIELD OF THE INVENTION

The present invention relates to systems and methods for collecting information about the behavior of the audience members of a content delivery system in order to serve targeted advertising. More particularly, the present invention relates to a universal data agent in the content delivery system that determines client metadata using a dynamic rules engine.

BACKGROUND OF THE INVENTION

The explosion of information across the Internet, cellular networks, digital television network, and other content delivery systems has led to a substantial challenge to publishers. Publishers need to understand behavior patterns as the audiences interact with the content. Very few publishers categorize their content and even fewer categorize it in a consistent and systematic way. Furthermore, content is constantly changing, both in volume and meaning. It is this lack of standardization that has led to search engines being central in the everyday use of the Internet. While there are existing applications that can use text mining and other techniques to properly categorize content, such techniques are often implemented as expensive, complex pieces of software that the average publisher can neither afford nor adequately maintain. In addition, such automated solutions may miss nuances that humans readily detect.

The following applications are hereby incorporated by reference in their entirety: U.S. patent application Ser. No. 10/669,791 filed on Sep. 25, 2003, and entitled "System and Method for Segmenting and Targeting Audience Members," U.S. patent application Ser. No. 10,981,733 filed on Nov. 5, 2004, and entitled "Audience targeting System with Segment Management," U.S. patent application Ser. No. 10/981,758 filed on Nov. 5, 2004, and entitled "Audience Targeting System With Profile Synchronization," U.S. patent application Ser. No. 11/014,235 filed on Dec. 17, 2004, and entitled "Network for Matching Network With Performance Factoring and Revenue Allocation," U.S. patent application Ser. No. 11/014,248 filed on Dec. 17, 2004, and entitled "Audience Matching Network With Performance Factoring and Revenue Allocation," U.S. patent application Ser. No. 11/132,429 filed on May 19, 2005, and entitled "Audience Server," U.S. patent application Ser. No. 11/014,234 filed on Dec. 17, 2004, and entitled "Audience Targeting With Universal Profile Synchronization," U.S. patent application Ser. No. 11/580,023 filed on Oct. 13, 2006, and entitled "System and Method for Preserving Consumer Choice," and U.S. patent application Ser. No. 60/906,859 filed on Mar. 14, 2007, and entitled "System and Method for Determining Client Metadata Using a Dynamic Rules Engine."

SUMMARY OF THE INVENTION

In order to address the challenges described above, a system and method for determining content categories is disclosed. A system for determining content categories, comprises a site management tool and a targeting engine. The site management tool transmits a data agent to a client device in a content delivery system in response to a request for content and transmits rules for use by a rules engine in the data agent. The targeting engine receives an indication of a content category and determines a segment of client devices based at least in part on the content category, which was determined by the data agent evaluating collected data with the rules and the rules engine.

In a method for determining content categories, a data agent that includes a rules engine is transmitted to a client device in response to a request for content. The rules engine is adapted to categorize content transmitted to the client device. Rules are transmitted to the client device for use by the rules engine in the data agent. An indication of a content category for content transmitted to the client device is received. The content category is determined by evaluating the collected data with the rules and the rules engine.

In another method for determining content categories, a data agent including a rules engine is received on a client device in response to a request for content. The rules engine is adapted to categorize content transmitted to the client device. Rules are received on the client device for use by the rules engine in the data agent. Data is collected with the data agent and an indication of a content category for content transmitted to the client device is determined. The content category is determined by evaluating the collected data with the rules and the rules engine.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

BRIEF DESCRIPTION OF THE DRAWINGS

In order to assist the understanding of this invention, reference will now be made to the appended drawings, in which like reference numerals refer to like elements. The drawings are exemplary only, and should not be construed as limiting the invention.

DETAILED DESCRIPTION OF PREFERRED EMBODIMENTS OF THE INVENTION

Reference will now be made in detail to system and method embodiments of the present invention, examples of which are illustrated in the accompanying drawings. As described herein, various embodiments of the present invention may include various systems and methods for determining client metadata using a dynamic rules engine.

Figure 1:
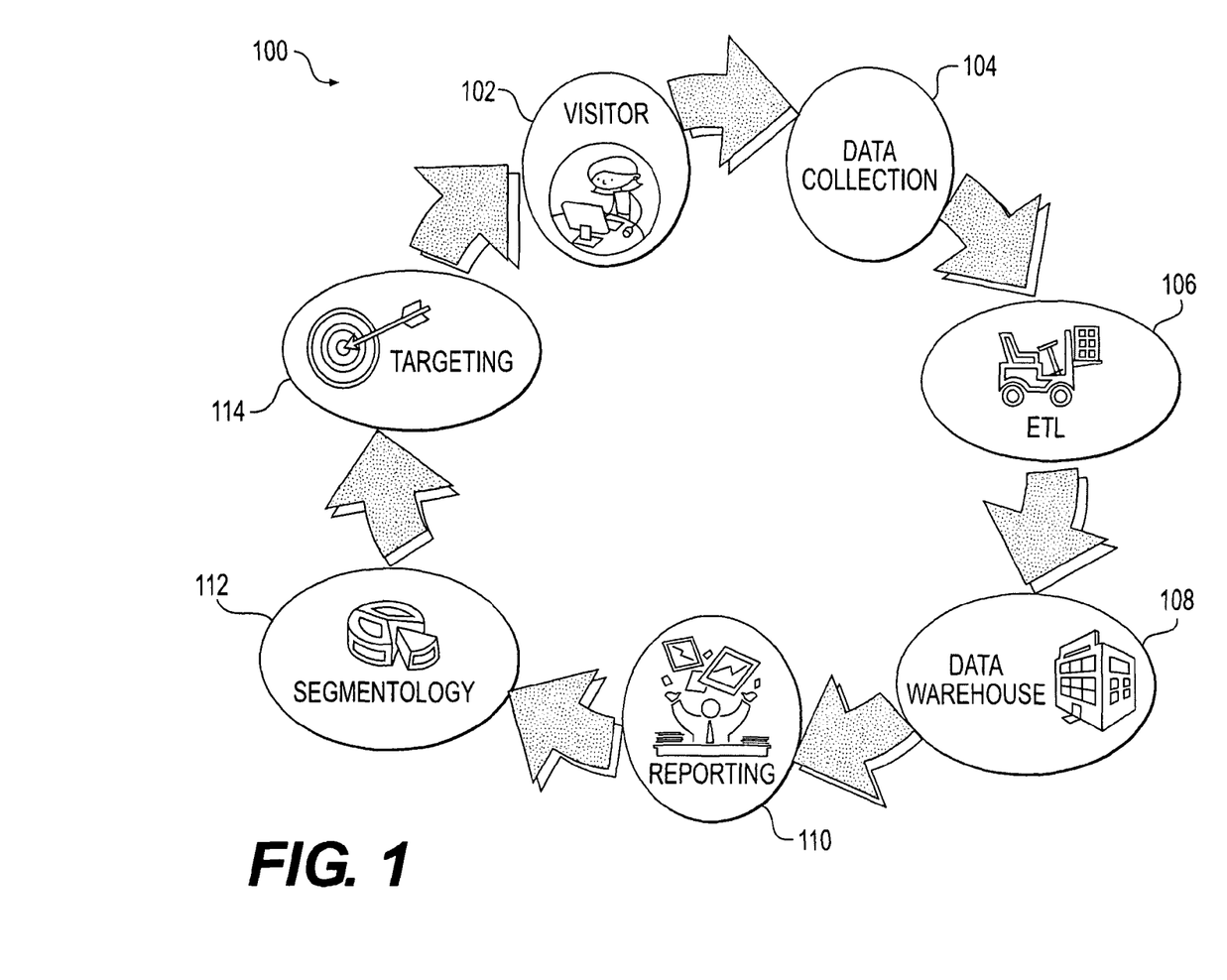
FIG. 1 is a block diagram showing an overview of an exemplary targeted advertising system and method embodiment.

FIG. 1 shows an overview of an exemplary targeted advertising system and method 100 in accordance with a first embodiment of the invention. The method may start with a visitor 102 using a content delivery system, which may cause a data collection component 104 of the system 100 to collect data about the visitor 102. The content delivery system may utilize any device capable of delivering content (e.g., news, information, games, movies) in anyway (e.g., over the Internet, on a cell phone, etc.). In an exemplary embodiment of the present invention, the step of data collection 104 may include determining what data to collect about the visitor 102. The collected data may include any information available from the content delivery system, such as, for example, words, phrases, uniform resource locators (URLs), functions, visitor activities, and other metadata. The collected data may be Extracted, Translated, and Loaded (i.e., ETL) 106 into a data warehouse 108. The data in the warehouse may then be used for reporting on collected data 110, segmenting the audience members 112, and ultimately targeting content 114 to the visitor 102.

For example, the visitor 102 may be anonymously grouped into a particular segment based on data collected 104 in order to provide targeted ads or other relevant messages. The visitor may be considered to be part of a specific audience segment such as, for example, active gamer, auto enthusiast, die hard sports fan, or news follower. Active gamers, for example, may be further defined as teens and adults who look for online and console game strategies, track release dates, and purchase video games. Auto enthusiasts, for example, may be further defined as car hobbyists who read about the latest models, look for car parts and accessories, or have a keen interest in vintage or high performance automobiles. Die hard sports fans, for example, may be further defined as dedicated fans that follow professional and collegiate sports scores and news, stay on top of favorite player rankings, and shop for sports memorabilia. News followers, for example, may be further defined as influential and informed readers of local, national, political and world news. Based on such general interests of the particular segment associated with the visitor, targeted ads or other relevant messages may be provided for the segment, while maintaining the privacy of the visitor. For example, a sports fan may be served an ad about an upcoming hockey game.

Figure 2:
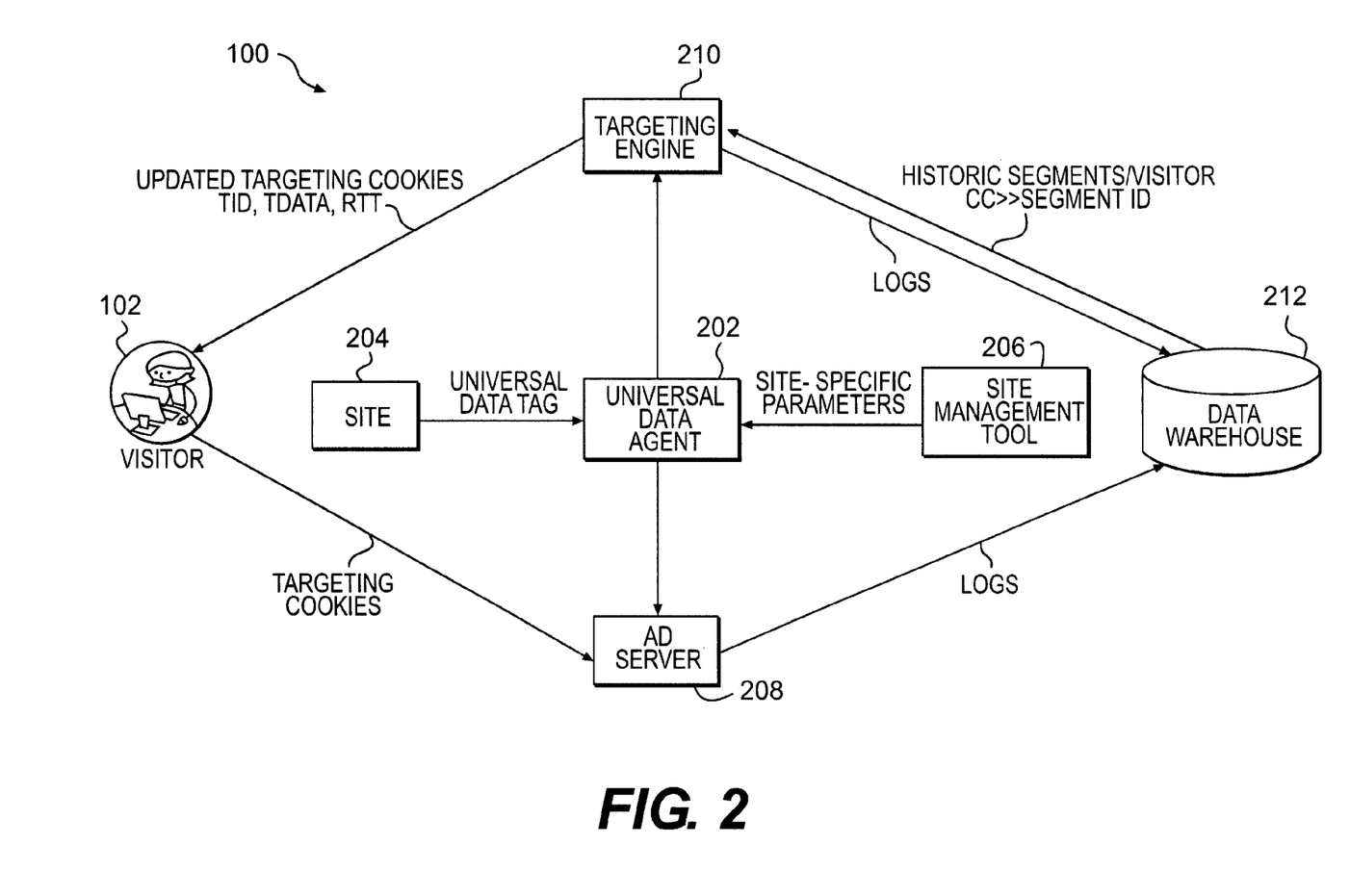
FIG. 2 is a block diagram showing the exemplary targeted advertising system embodiment of FIG. 1 in more detail, including a universal data agent.

FIG. 2 shows the exemplary targeted advertising system 100 of FIG. 1 in more detail. An exemplary embodiment of the present invention may utilize a universal data agent 202, which participates in the data collection 104 shown in FIG. 1. Suppose the visitor 102 accesses at a site 204, such as a website, for example, http://espn.go.com/nhl/index.html. The site 204 may be any content provider who participates in an advertising network as a data provider or an inventory provider. A data provider is an owner of a content delivery system that provides data about its audience. An inventory provider may be an owner of a content delivery system that provides space for ads. In some instances, a content delivery system may serve as both a data and inventory provider.

The site 204 may contain one or more universal data tags inside a scripting area running on a client-server content delivery system (e.g., a web browser), for example, a client-side JavaScript area. The universal data tag may cause instructions for the universal data agent 202 to be executed by, for example, placing a call to a site-specific universal data agent 202, a generic universal data agent 202, a default universal data agent, and the like. A site-specific universal data agent 202 may operate in a way that is specifically related to the particular content on the site 204 or to the particular desires of the owner of the site 204, while a generic one may operate the same way for many different sites 204.

An example of a universal data tag is:

```
<SCRIPT LANGUAGE="JavaScript">
var tcdacmd="cc=APP;sa=f; sz=1;dt;ad;";
</SCRIPT> <SCRIPT
SRC="http://an.tacoda.net/an/80000/slf.js"
LANGUAGE="JavaScript"></SCRIPT>
```

In this example, the browser associated with the visitor 102 may execute the universal data tag, which may cause the browser to go to another website (e.g., http://an.tacoda.net/an/80000/slf.js) to retrieve the most current source code to run in this script. In this example, a content category (i.e., cc=APP) variable may be hard-coded and may be a default value that may be changed later, however, universal data tags may leave the content category undefined. The content category may classify the content on the site 204 (e.g., apparel, sports, etc.) to be used by the targeted advertising system 100. When the content category is undefined, the universal data agent 202 may dynamically determine the content category. For example, the URL of the site 204, http://espn.go.com/nhl/index.html, may be evaluated against a set of rules provided for use by a rules engine in the universal data agent 202 to produce a result, e.g., a content category. In this example, a portion of the URL, "nhl", may match a rule that sets content category to hockey, (i.e., cc=HCK).

In FIG. 2, the universal data agent 202 may receive one or more site-specific parameters, such as, for example, content category, data provider, not a data provider, inventory provider, ad size, site area, or request page for iframes. The site-specific parameters may be received by the universal data agent 202 from a site management tool 206 and may be used by an ad server 208 to serve ads in association with or on the site 204. Site-specific parameters may also be defined in a universal data tag associated with or on the site 204. The universal data agent 202 may be configured and managed by the site management tool 206.

The universal data agent 202 may call the ad server 208 and pass information, such as, for example, the audience segment that the visitor 102 belongs to and the site area where the inventory provider site 204 desires an ad to be placed. The ad server 208 may deliver an ad targeted at the segment or provide other relevant content. For example, if the visitor 102 is visiting a news site, the site area may be the classifieds section, and the visitor 102 may be interested in sports based on previous data collected, the ad server 208 may deliver a sports ad as the targeted content for the classified section on the site 102 or, if all of the sports ads have been used, may deliver a public service announcement to be provided in association with the site 102.

The universal data agent 202 may call a targeting engine 210. The targeting engine 210 may set the visitor's 102 targeting cookies and log the visitor's 102 behavior. The logs may contain information such as, for example, host, date time, request, site session, network session, and target identifier, and logs may be stored in a data warehouse 212. The data warehouse 212 may be any storage device, such as a database. Targeting cookies may be cookies that are delivered to a visitor's 102 client device (e.g., a browser) and that may originate from a site other than the site 204 that the visitor 102 is visiting. Targeting cookies may be used to store segment identifiers generated at least in part from the content categories. Targeting cookies may uniquely identify a visitor 102 and may be used by the ad server 208 for targeting ads.

When a visitor visits site 204, the targeting engine 210 may retrieve segment memberships and content categories from the data warehouse 212 and data collected about the visitor 102. The targeting engine 210 may store targeting cookies on the visitor's 102 client device to be retrieved on subsequent visits to site 204, such as a personal computer or cell phone. Logs from the targeting engine may be stored in the data warehouse 212 periodically. The targeting engine 210 may recalculate segment membership and/or content categories periodically and update targeting cookies.

FIGS. 3-9 are flow charts of an exemplary method of the present invention for determining client metadata using a dynamic rules engine. In one embodiment, the universal data agent 202 of FIG. 2 may perform this exemplary method.

Figure 3:
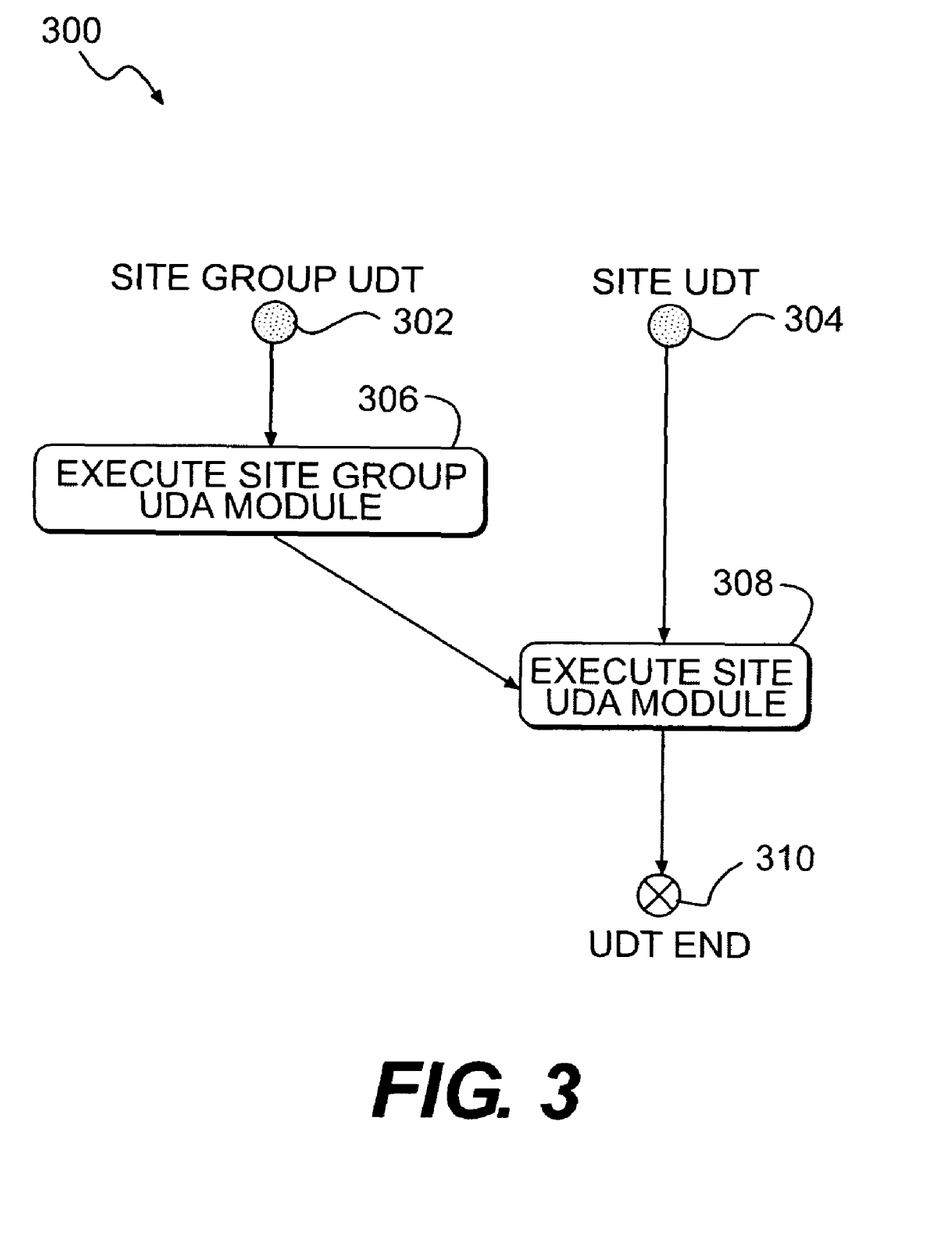
FIG. 3 is a flow chart illustrating the manner in which the universal data agent of FIG. 2 may perform an exemplary entry point determination method, which may include exemplary site and site group module methods. The flow charts of FIGS. 3-9 together illustrate an exemplary method in accordance with an embodiment of the present invention for determining client metadata using a dynamic rules engine.

FIG. 3 illustrates how the universal data agent 202 of FIG. 2 may perform an exemplary entry point determination method 300. In this exemplary method, there are two entry points 302, 304 into the universal data agent 202, depending on the universal data tag on the site 204. One entry point may be the site group 302 and the other entry point may be the site module 304. For example, if a group of publishers all share the same content delivery, then the group could place one universal data tag on all of the sites 102 owned by the group of publishers to minimize management of the group. Each site may have a unique identifier and each group has a unique identifier. Given a group identifier, the universal data agent 202 can determine the site identifier using, for example, the URL of the calling or referring site. If the entry point is the site group 302, then the universal data agent 202 may perform a site group module method 306. If the entry point is the site module 304, then the universal data agent 202 may perform a site module method 308. The entry point determination method 300 terminates at 310.

Figure 4:
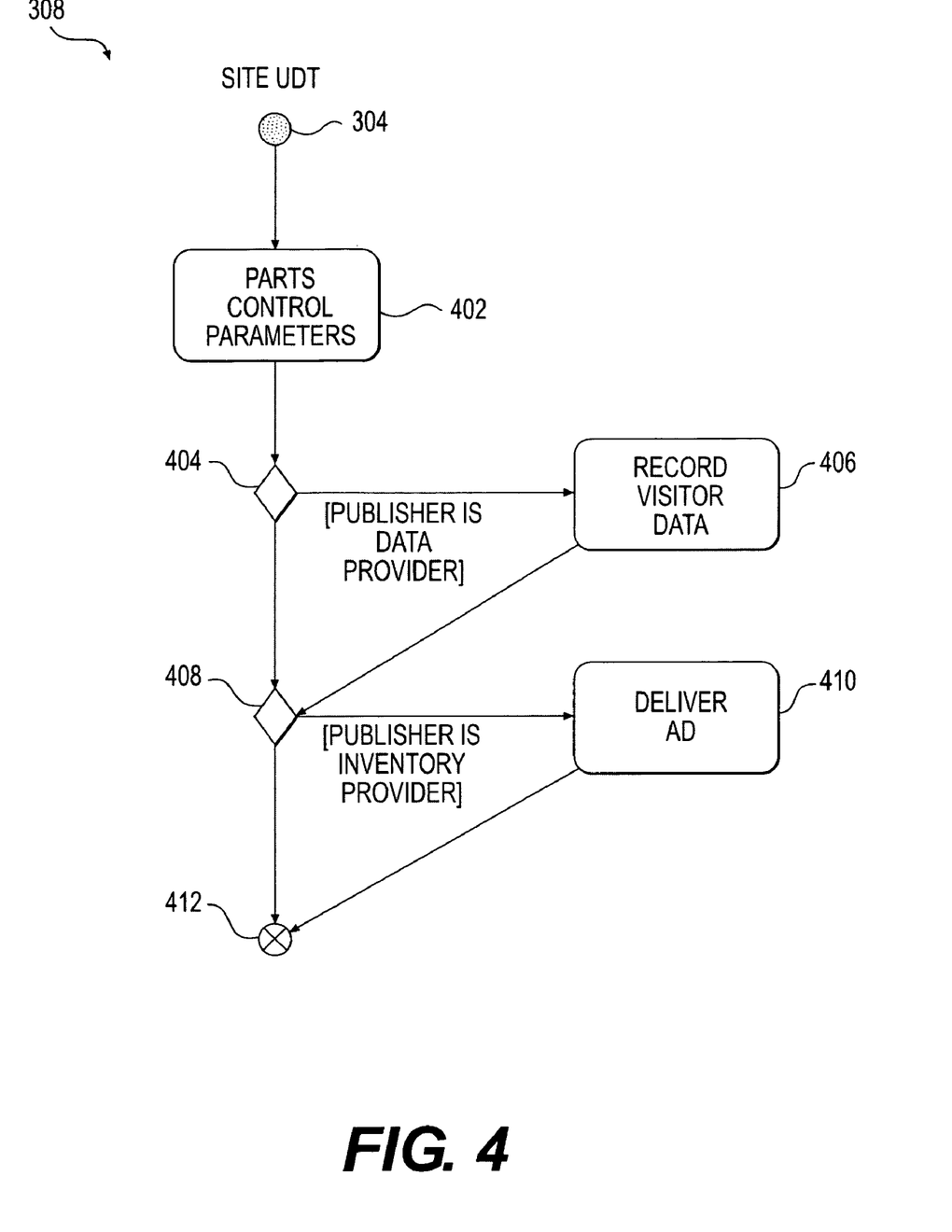
FIG. 4 is a flow chart illustrating the manner in which the universal data agent of FIG. 2 may perform the exemplary site module method of FIG. 3, including a record visitor data method and a deliver ad method.

FIG. 4 illustrates the manner in which the universal data agent 202 of FIG. 2 may perform the exemplary site module method 308 of FIG. 3. FIG. 4 starts at the site module entry point 304 of FIG. 3. A publisher of a site 204 may place one or more universal data tags on the site 204. The universal data tag may call the universal data agent 202. At 402 the universal data agent 202 may parse control parameters received from the site management tool 206. At 404, the universal data agent 202 may determine whether the publisher is a data provider and, if so, collect and record visitor data 406. At 408, the universal data agent 202 may determine whether the publisher is an inventory provider and, if so, deliver one or more ads 410. Thus, the universal data agent 202 may operate differently depending on whether the site is a data provider or an inventory provider. If the site is both a data provider and an inventory provider, the universal data agent 202 may both record visitor data 406 and deliver ads 410. The site module activity method 300 terminates at 412.

Figure 5:
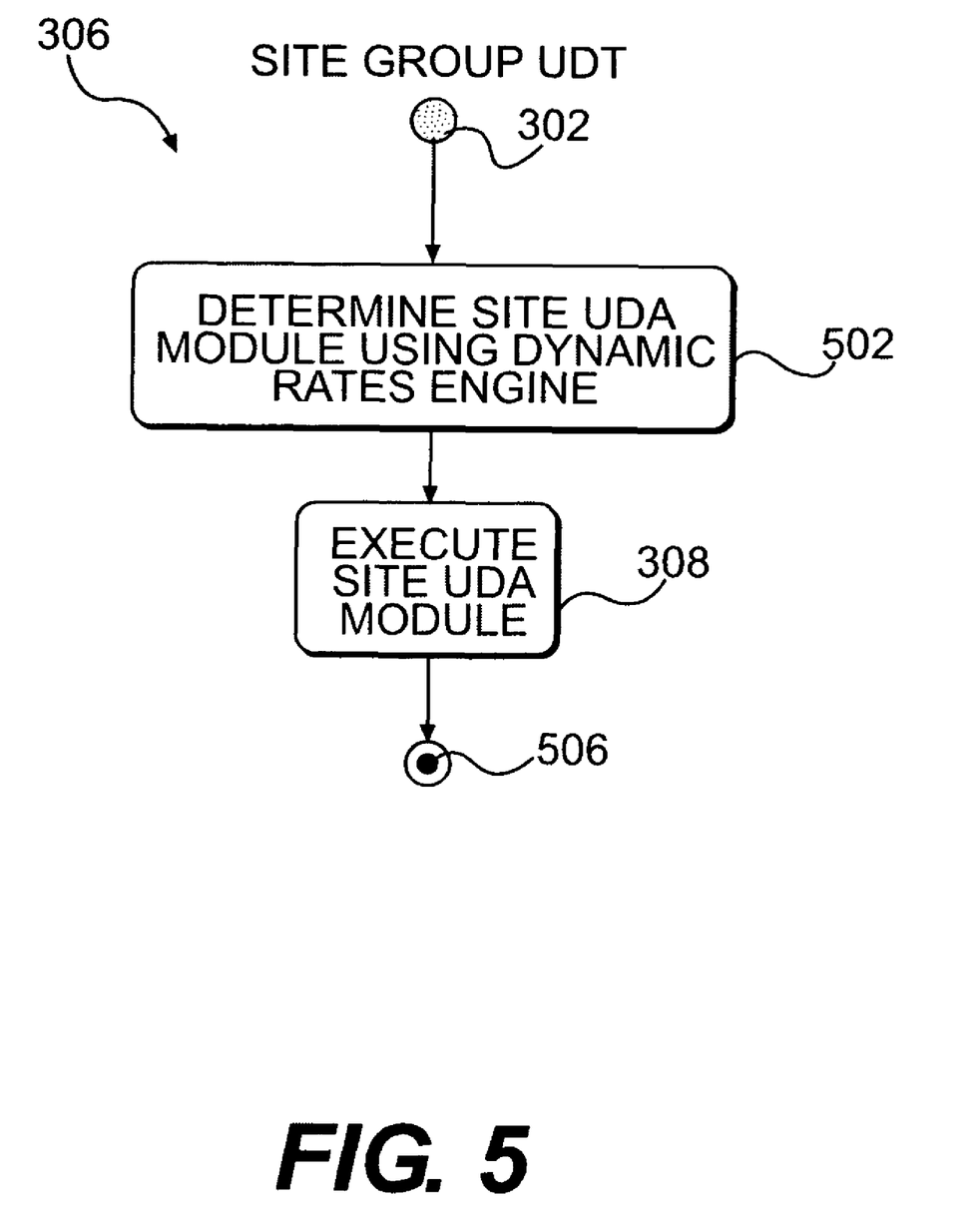
FIG. 5 is a flow chart illustrating the manner in which the universal data agent of FIG. 2 may perform the exemplary site group module method of FIG. 3.

FIG. 5 illustrates the manner in which the universal data agent 202 of FIG. 2 may perform the exemplary site group module method 306 of FIG. 3. In this exemplary site group module method 306, the universal data agent 202 may determine the site module using the dynamic rules engine at 502 and then executes the site module method 308 of FIG. 4, terminating at 506.

Figure 6:
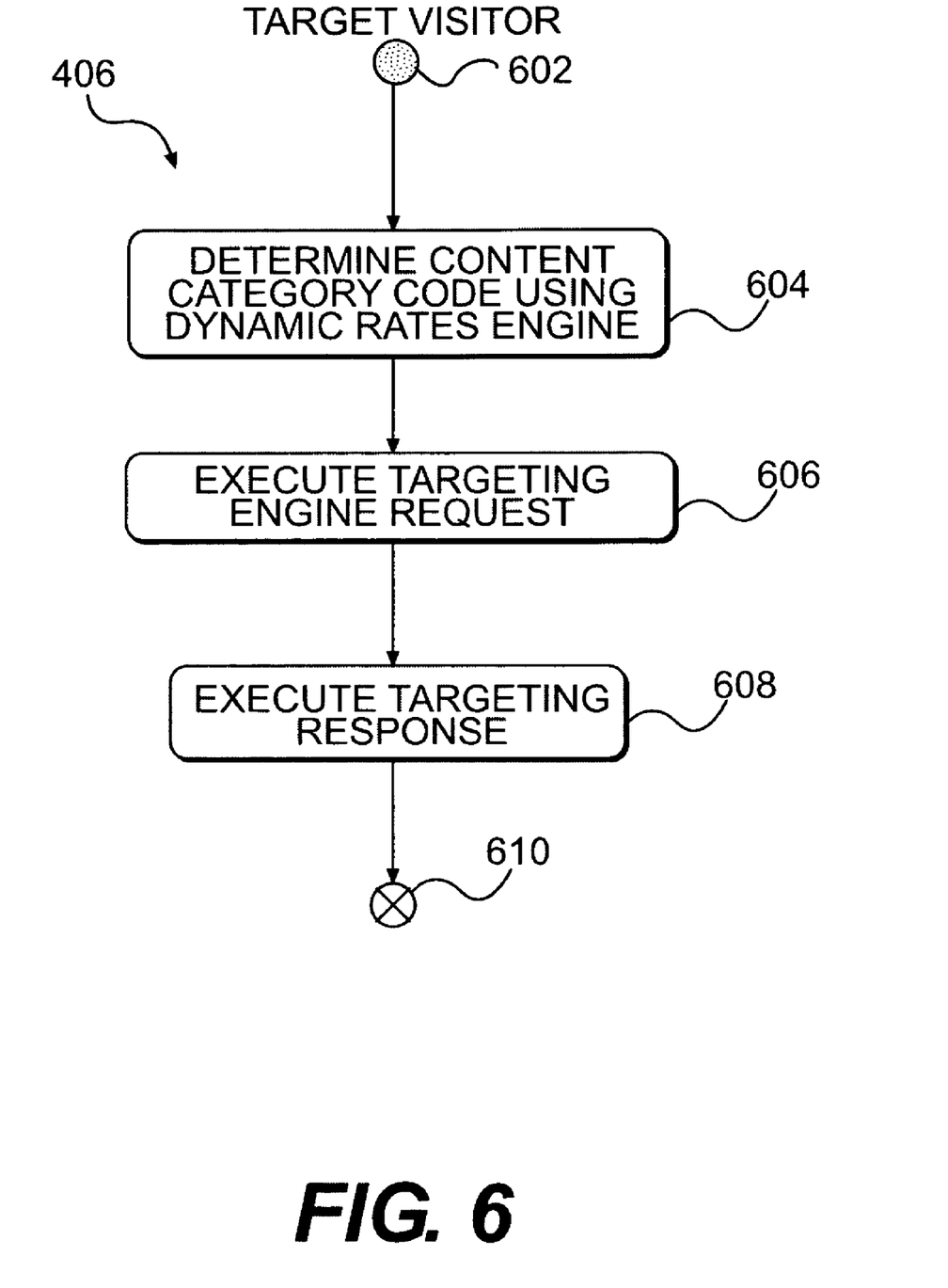
FIG. 6 is a flow chart illustrating the manner in which the universal data agent of FIG. 2 may perform the record visitor data method of FIG. 4.

FIG. 6 illustrates how the universal data agent 202 of FIG. 2 performs the record visitor data method 406 of FIG. 4. For a target visitor 602, the universal data agent 202 determines a content category using the dynamic rules engine, executes a targeting engine request 606, (optionally) executes a targeting response 608, and then terminates 610. Upon receiving the targeting engine request 606, the targeting engine 210 records the content category in a log stored in the data warehouse 212 and returns the targeting response to the universal data agent 202.

Figure 7:
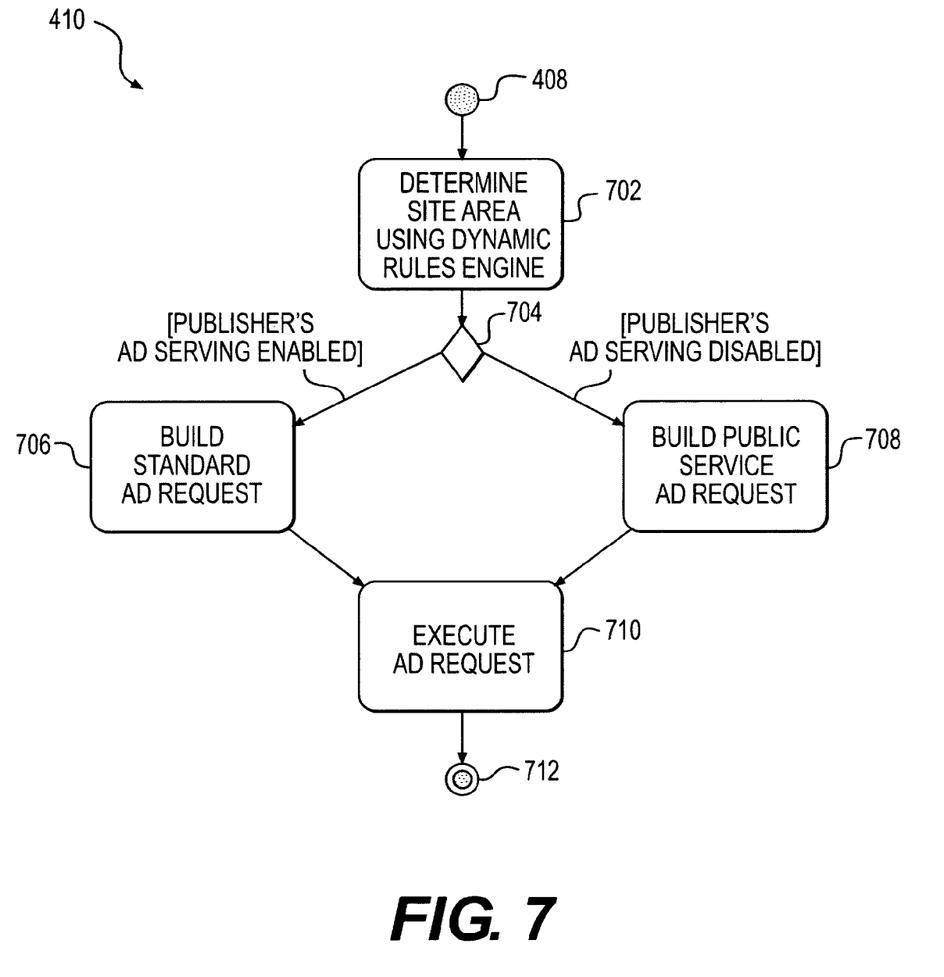
FIG. 7 is a flow chart illustrating the manner in which the universal data agent of FIG. 2 may perform the deliver ad method of FIG. 4.

FIG. 7 illustrates the manner in which the universal data agent 202 of FIG. 2 may perform the deliver ad method 410 of FIG. 4. After the universal data agent 202 has determined that the publisher is an inventory provider at 408, the universal data agent 202 may determine a site area (i.e., location on the site for an ad) using the dynamic rules engine at 702. The universal data agent 202 may determine whether the publisher's ad serving is enabled at 704. Depending on whether the publisher's ad serving is enabled, the universal data agent 202 may build a standard ad request 706 or a public service ad request 708 and execute the ad request at 710. The deliver ad method may terminate at 712. Disabling ad service may advantageously handle any universal data tags remaining on a site 204 that no longer pay for ad service without causing an error.

Figure 8:
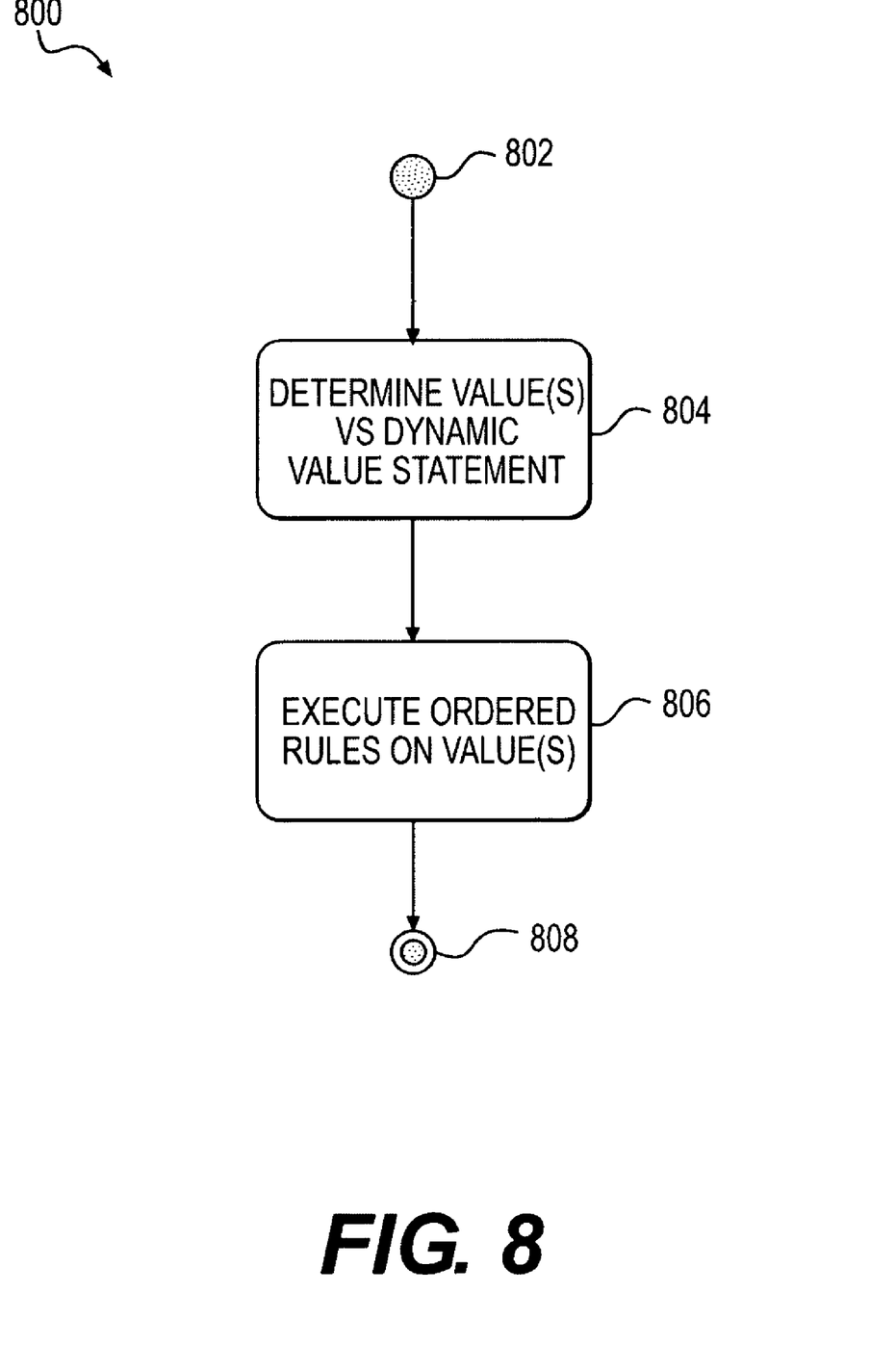
FIG. 8 is a flow chart illustrating the manner in which the universal data agent of FIG. 2 may perform a method of executing the dynamic rules engine, including a method of evaluating the values using the dynamic rules engine.

FIG. 8 illustrates the manner in which the universal data agent 202 of FIG. 2 may perform a method of executing the dynamic rules engine 800. The rules engine may be dynamic in the sense that the current, applicable rules may be retrieved from the site management tool 206 to be executed in the universal data agent 202 at or close to the time that the visitor 102 is visiting the site 204. The universal data agent 202 may execute the dynamic rules engine 800 from a number of different entry points 802. The universal data agent 202 may determine one or more values to evaluate at 804, evaluate the values using the dynamic rules engine at 806 to determine a result such as a content category, and then terminate at 808. For example, the visitor 102 may have accessed the site 204 after visiting a search engine. In this case, the key words from the search may be evaluated by the dynamic rules engine in the universal data agent 202 to determine a content category for the site 204, rather than using, for example, a default content category provided in association with or on the site 204 itself.

Figure 9:
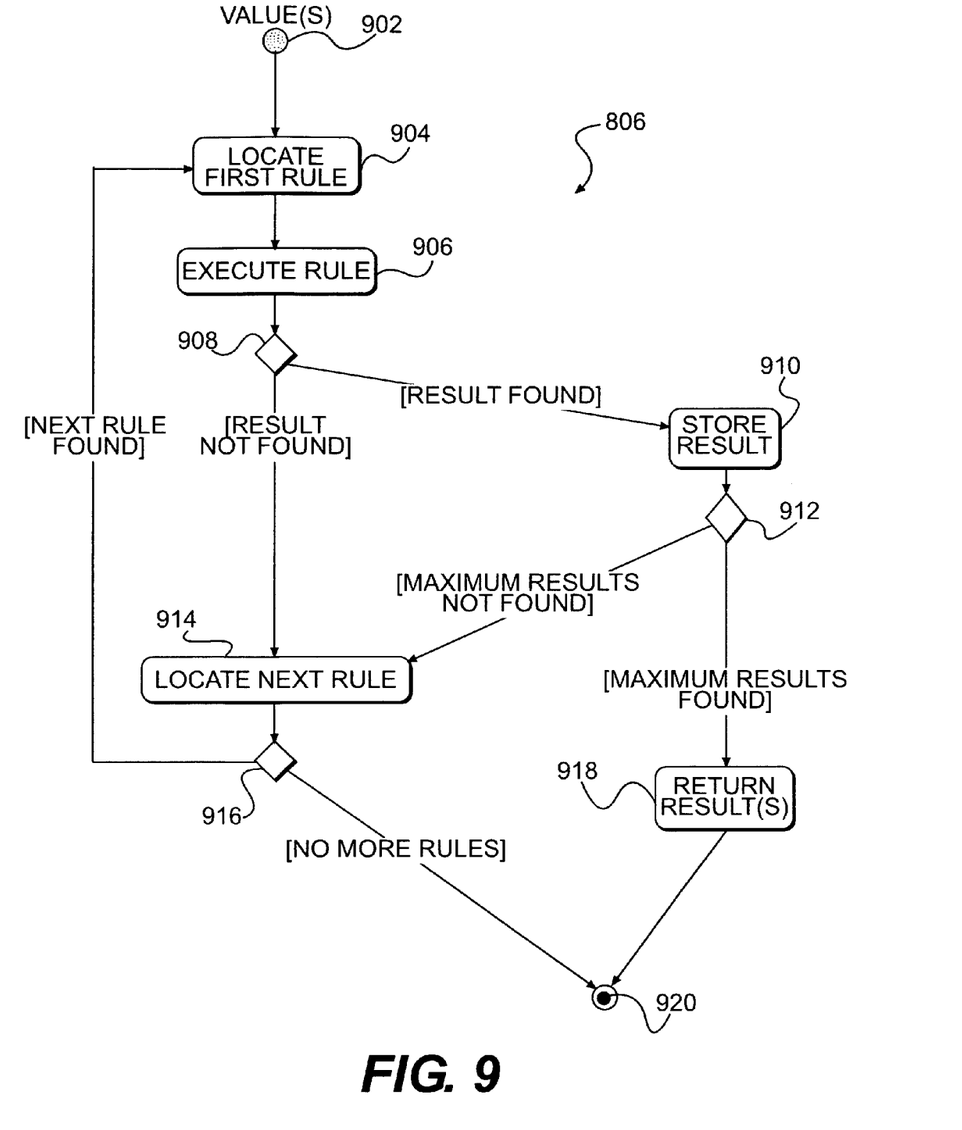
FIG. 9 is a flow chart illustrating the manner in which the universal data agent of FIG. 2 may perform the method of evaluating the values using the dynamic rules engine of FIG. 8.

FIG. 9 illustrates the manner in which the universal data agent 202 of FIG. 2 may perform the method of evaluating the values using the dynamic rules engine 806 of FIG. 8. One or more values 902 may be evaluated. The dynamic rules engine in the universal data agent 202 may load the first rule at 904 and then evaluates the values 902 using the first rule at 906. The dynamic rules engine may determine whether the evaluation resulted in a final result at 908 and, if so, store the result at 910. If the dynamic rules engine determines that only one result is desired at 912, that stored result may be returned at 918 and the method 806 may terminate at 920. If more than one result is desired at 912, the next rule may be located at 914 and evaluated at 906 and this may continue in a loop until there are no more rules to evaluate at 916.

In one embodiment, a publisher may put a universal data tag on a site 204. The tag may call the universal data agent 202 at another site. The publisher may be a data provider for a targeted ad server. The tag may call the domain of the targeted ad server and retrieve JavaScript for the universal data agent 202. The universal data agent 202 may enable or facilitate serving targeted ads to the publisher's site 204. The universal data agent 202 may dynamically discover a content category based on, for example, the structure of the publisher's site.

An executable may be created by the site management tool using a template from the universal data agent 202. After delivering JavaScript to the client-side, the visitor's 102 client device (e.g., a browser) may run in the publisher's domain and retrieve and execute universal data agent code inside the publisher's domain. The universal data agent code may have access to everything inside the publisher's domain. After rules run, the universal data agent 202 may call the ad server 208 to deliver a content category. The ad server 208 may save the content category along and in association with the visitor's unique identifier in a database. Then, a segmenting process 210 may use that information to determine a segment for the visitor 102. When there are previous logs for a visitor 102, the prior content categories may be used to determine, for example, a default content category.

In this embodiment, rules may be organized in various ways. For example, a site group may have a set of rules in addition to rules for the specific site. The rules may be grouped by a parent publisher. The unique identifier for the site may be retrieved dynamically so that a single universal data agent 202 may be used for all sites, as opposed to needing a data agent for each site with a hard-coded site identifier.

The rules engine may have a rule/value/result format. A value to analyze may be collected from the content on the site, e.g., the URL http://espn.go.com/nhl. The value of the URL may be run through the first rule. The next rule may be: if the URL starts with "espn", then the content category is sports. Sometimes additional rules may be run after a match or hit to find a better or refined result. For example, the first rule is: if the URL contains "nhl", the content category may be hockey.

In this embodiment, the universal data agent 202 may have many functions. The universal data agent 202 may determine whether a site 204 is a data and/or inventory provider and then perform appropriate operations. The universal data agent 202 may, for example, perform the appropriate operations for an inventory provider and/or data provider or perform as a content category mechanism. For example, the universal data agent 202 may determine a unique identifier for the site, such as a site area code, which may be used to provide specific functions for that site. For inventory providers, the universal data agent 202 may determine where to place an ad on the site.

Content categories may be delivered from the universal data agent 202 to the targeting engine 210, which may optionally combine the content category with other information to determine a segment. A segment may comprise a group of visitors that have the same or similar attributes, e.g., content category, age, income, etc. The segment identifiers may be used to target ads to the visitors in the segment.

The following table illustrates some examples of target expressions that may used to drive the dynamic rules engine. This table only shows a small sample of the possible target expressions. When a value is returned by an expression, the value may be run through the dynamic rules engine to look for a match.

| Target Expression | Description |
| --- | --- |
| Document.location.href | page URL |
| Document.location.referrer | URL of page which referred visitor to this page. Often, this will be a search engine and will include the search terms entered by the visitor. |
| SafeVar('genGenre') | SafeVar is a small function to first verify that a variable exists, and if it does return it contents otherwise return nothing. This prevents an error from being generated in the event the variable does not exist. The variable genGenre, if present, contains the genre of a movie. |
| GetMetaTag('taxonomy')+':'+getMetaTag('TopicName') | This expression retrieves the contents of two page meta tags and concatenates them together, separated by a colon. |

| Target Expression | Description |
|---|---|
| OAS_sitepage | This refers to a JavaScript variable which is typically present on pages where a product is used for ad serving. This variable typically contains information about the subject of a page. |
| CarYear(document.getElementsByTagName('title')[0].text)+ document.location.href | This expression uses a function to retrieve the year of a car on a cars classifieds page and concatenates it with the page URL. |

Figure 10:
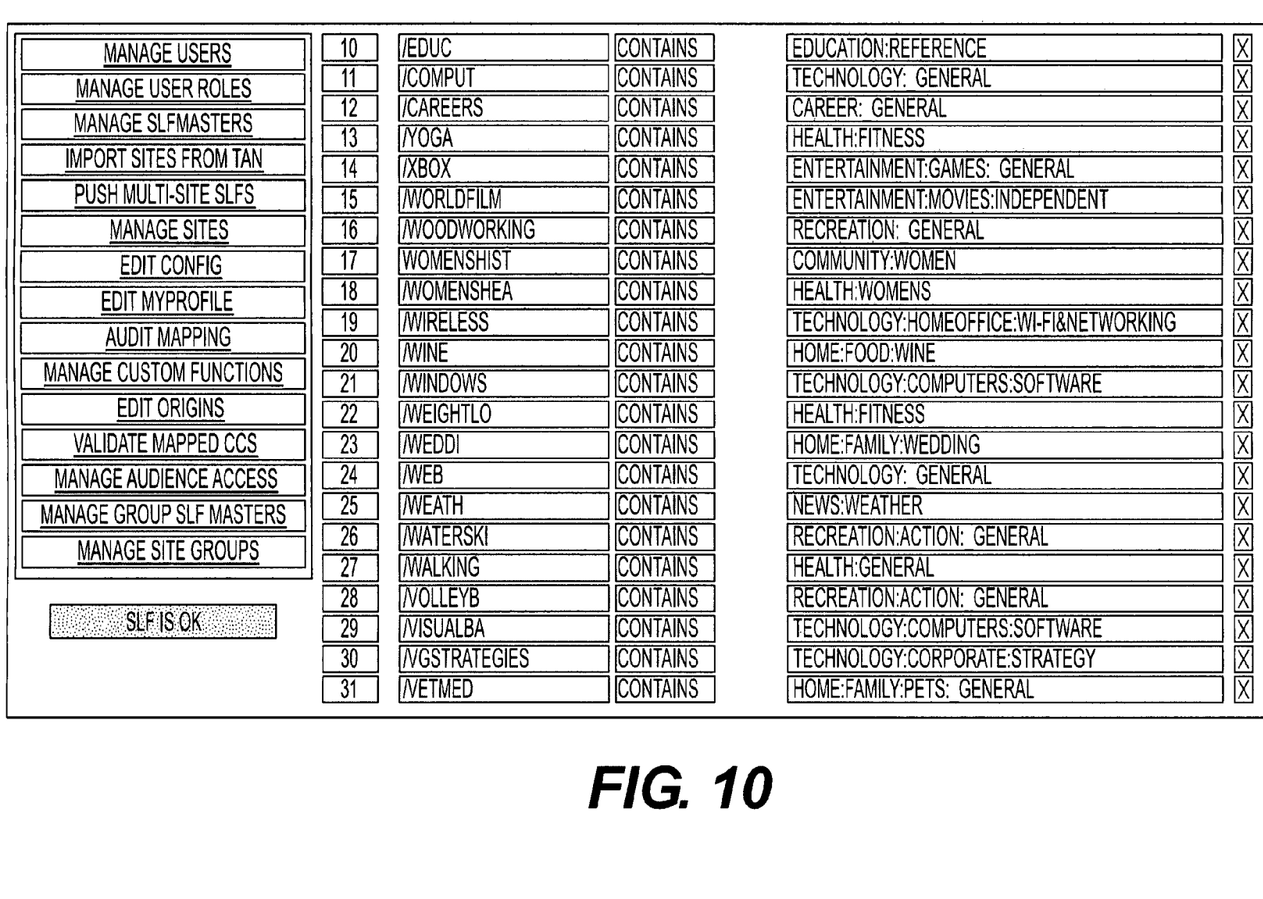
FIG. 10 is a screen shot of an exemplary site management console, which may serve as a user interface for managing the site management tool of FIG. 2.

FIG. 10 is a screen shot of an exemplary site management console, which is a user interface for managing the site management tool 206 of FIG. 2. FIG. 10 illustrates some sample rules and the columns from left to right include: number representing an order of rules evaluation, value to use for rule comparison (e.g., URL fragment), operator to use for rule comparison (e.g., equals, contains, starts-with, ends-with or regular expression), and resulting content category (e.g., a three character code representing the category).

A rule may take many forms, depending on the type of content and the content delivery system interacting with the visitors in the audience. The evaluation of a rule typically involves at least four components: the operator or rule type, the operand, the pattern, and the result. There are a wide variety of possible operators. Generally, operators may be any instruction or set of instructions that direct the content delivery system to look in a particular location for information used to categorize the visitor or content. For example, simple operators may include standard text operations such as a contains rule, a starts with rule or an ends with rule. More complex rules may use operators that comprise regular expressions or script execution. Operators may be represented by symbols, alphanumeric characters, or other representations. The particular representation of an operator is not intended to be a limitation on the ways in which an operator may be represented or a limit on the types of operator that may be used in a given design or implementation.

An operand may comprise one or more characteristics of the audience or the content through a code or script framework, which may be evaluated to categorize the audience and/or content. For example, a variety of characteristics of a web browser and the content currently being displayed in the web browser may be accessed via JavaScript placed on the page. In one embodiment, examples of available characteristics are the URL of the content, the display resolution, the universal data agent 202 in the browser, the size of images displayed with the content or the text of the content itself. Similarly, in one embodiment for displaying video on a consumer electronics device, such as a cell phone or personal media player, the resolution of the video, the make and model of the player, and the start and end time of the viewing are examples of characteristics that might be evaluated to categorize the client or the content.

A pattern may be any information that the operator searches for through the operand. The form of the pattern may depend entirely on the type of operator and the desired result. For example, a word fragment would be the appropriate pattern for a contains operator, while for a regular expression operator, a regular expression pattern would be used.

The results may be a category for the content or an interest category for the client user of the content. The results may also be an aggregation of the results of more than one rule. For example, rules may operate on the results of a preceding rule to carry out simple conditional statements, such as "if the user agent is safari and the content category is music, the interest category of the user is Ipod."

The particular algorithm used to implement a given rule may be dependent upon the operator or rule type involved, but the operator may be fixed across all operands and patterns. For example, the algorithm for a starts with operator would compare, starting with the first letter of both the pattern and the operand, continuing until either there is a mismatch between the two (no result) or until the pattern is fully processed (successful result).

Whatever the nature of the rules processing and the aggregation of results, the completion of the evaluation of all rules may trigger a result being sent back to the rules engine server or other server as designated for storage and further analysis. The results may be used to determine the content that the client is interested in, and thereby be used to select content for future consumption by the client.

Figure 11:
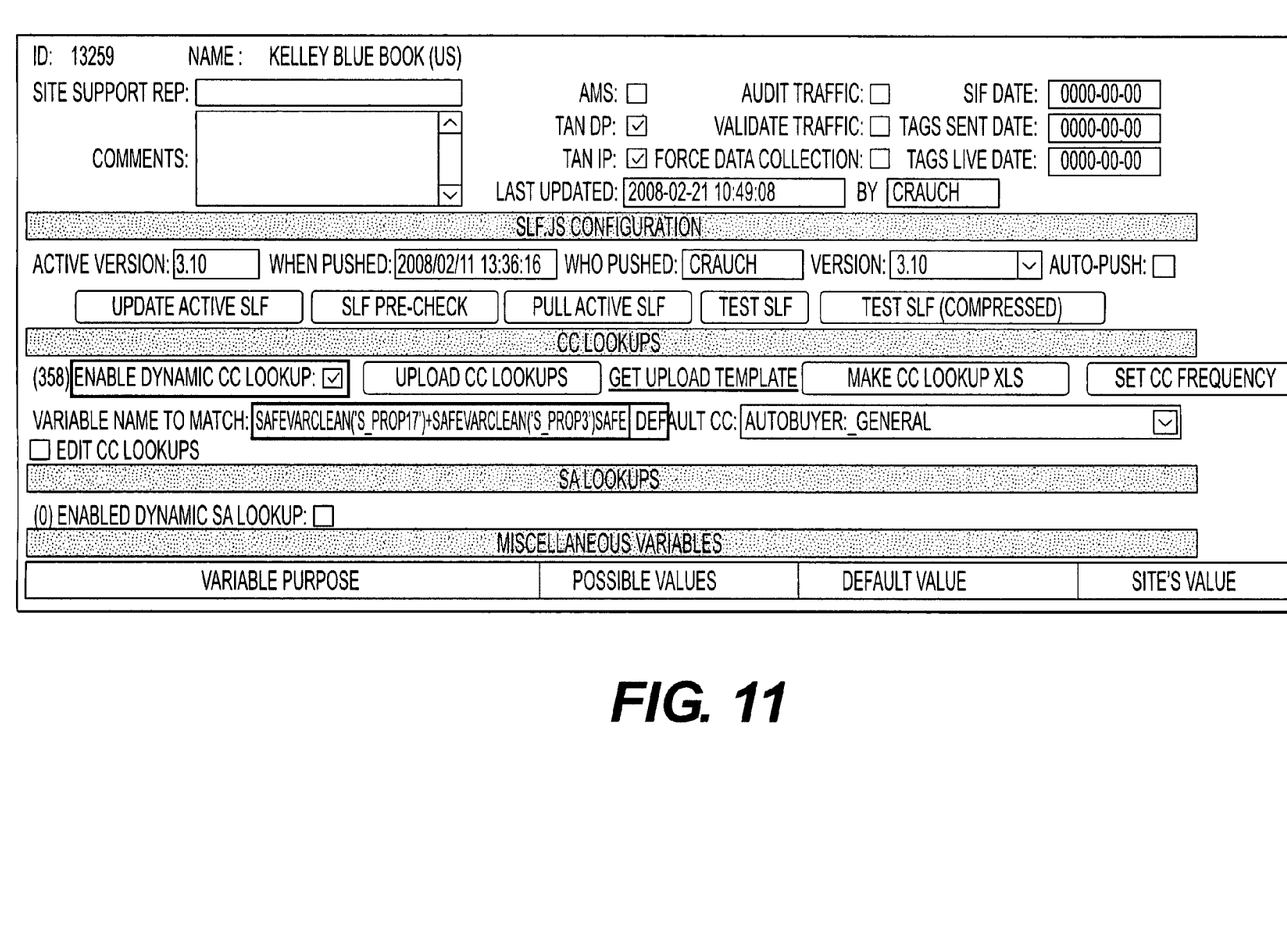
FIG. 11 is a screen shot of an exemplary configuration screen, which may serve as a user interface for the site management tool of FIG. 2.

FIG. 11 is a screen shot of an exemplary configuration screen, which is a user interface for the site management tool 206 of FIG. 2. FIG. 11 illustrates the selection of a variable on a Kelley Blue Book website to be evaluated by the dynamic rules engine of the universal data agent 202 of FIG. 2. This decision to use this particular variable may be part of the configuration of a site-specific universal data agent 202 by the site management tool 206. Depending on the implementation of the universal data tags and the content available on a particular site 204, the universal data agent 202 may use one of many possible methods to dynamically determine a content category. The following are some exemplary elements and variables commonly available at the site 204 that may be evaluated by the dynamic rules engine: URL, referrer, title, description, keywords, h1, alt, b, body, href, link, meta, caturl, italics, td, div, omniture variables, OAS variables, and query string. In addition, the universal data agent 202 may use a number of functions to extract this information from the site 204. The function used to dynamically extract information may be a concatenation of several functions as well as the URL, such as, for example, safeVarClean('s_prop17')+safeVarClean('s_p_prop3')+safeVarClean('s_prop22')+document.location.href. In this example, the universal data agent 202 concatenates a number of variables captured by the safeVarClean( ) function below, which returns the variable to be evaluated, minus the following characters: #:.?=_-+%&, or nothing with the URL String.

```
function safeVarClean(variable) {
    var ret;
    try {
        eval('ret = '+variable+';');
    } catch(err) {
        ret = '';
    }
    rExp = new RegExp("[#/:.?=_+%&\-]", "gi");
    return unescape(ret).replace(rExp, "");
}
```

Figure 12:
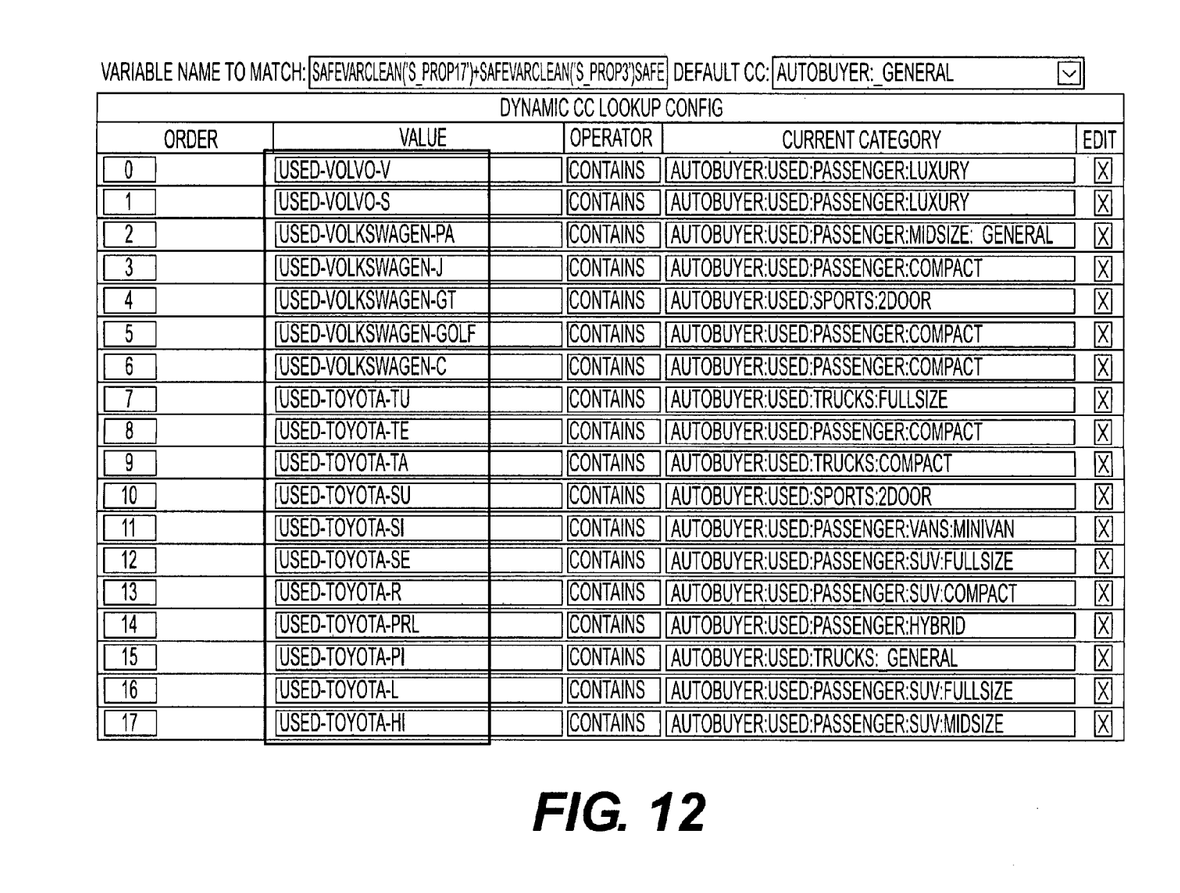
FIG. 12 is another screen shot of an exemplary site management console, which may serve as a user interface for the site management tool of FIG. 2.

FIG. 12 is another screen shot of an exemplary site management console, which is a user interface for the site management tool 206 of FIG. 2. FIG. 12 illustrates some sample rules and the columns from left to right are: number representing an order of rules evaluation, value to use for rule comparison (e.g., keywords), operator to use for rule comparison (e.g., equals, contains, starts-with, ends-with or regular expression), and resulting content category (e.g., a three character code representing the category).

It will be apparent to those skilled in the art that variations and modifications of the present invention can be made without departing from the scope or spirit of the invention. For example, references to the delivery and targeting of ads are exemplary only, and it is appreciated that any content may be so delivered and targeted using various embodiments of the invention. Thus, it is intended that the present invention cover all such modifications and variations of the invention, provided they come within the scope of the appended claims and their equivalents.

What is claimed is:

1. A method for determining content categories and delivering content to a client device, comprising:
    transmitting a data agent including a rules engine to a client device in response to a request for content, the rules engine adapted to categorize content transmitted to the client device;
    transmitting a plurality of rules to the client device for use by the rules engine in the data agent;
    receiving an indication of a content category for content transmitted to the client device, wherein the content category is determined by evaluating the collected data with the rules and the rules engine;
    associating the client device with a segment of client devices using a segment identifier based at least in part on the content category; and
    transmitting content to the client device based on the association of the client device with the segment of client devices,
    wherein the indication of content category and the segment identifier are distinct from each other.

2. The method of claim 1, further comprising the step of executing with the client device a data tag having an instruction for transmitting the data agent.

3. The method of claim 1, further comprising:
    receiving a site identifier associated with a site from which content was transmitted to the client device, wherein the rules to be transmitted to the client device are selected at least in part based on the site identifier.

4. The method of claim 1, further comprising:
    receiving a group identifier associated with a site from which content was transmitted to the client device identifying a particular group of sites, wherein the rules to be transmitted to the client device are selected at least in part based on the group identifier.

5. A method for determining content categories and delivering targeted content to a client device, comprising:
    associating a universal data tag with a content providing website, wherein the data tag includes an instruction for transmitting a data agent;
    transmitting the universal data tag to a client device in response to the client device accessing the website;
    transmitting the data agent including a rules engine to the client device in response to execution of the universal data tag at the client device, wherein the rules engine is adapted to categorize content transmitted to the client device;
    transmitting a plurality of rules to the client device for use by the rules engine in the data agent;
    receiving an indication of a content category for content transmitted to the client device as a result of operation of the data agent, wherein the content category is determined by evaluating data collected as a result of execution of the rules by the rules engine;
    associating the client device with an audience segment based on the content category;
    transmitting a targeting cookie to the client device based on the association of the client device with an audience segment, said targeting cookie including a segment identifier for the audience segment with which the client device is associated;
    receiving an indication of the segment identifier included in the targeting cookie; and
    delivering content to the client device based on the segment identifier,
    wherein the indication of content category and the segment identifier are distinct from each other.

6. The method of claim 5, wherein the content category is determined at least in part from universal resource locator information.

7. The method of claim 5, further comprising:
    receiving a website identifier associated with a website from which content was transmitted to the client device, wherein the rules to be transmitted to the client device are selected at least in part based on the website identifier.

8. The method of claim 7 wherein the website identifier is provided in the data tag.

9. The method of claim 5, further comprising:
    receiving a group identifier associated with a website from which content was transmitted to the client device identifying a particular group of websites, wherein the rules to be transmitted to the client device are selected at least in part based on the group identifier.

10. The method of claim 9 wherein the group identifier is provided in the data tag.

11. The method of claim 5 further comprising the step of periodically transmitting a current plurality of rules to the client device, which current plurality of rules replace any previously transmitted plurality of rules.

12. The method of claim 5 wherein:
    the receipt of an indication of a content category for content transmitted to the client device is accompanied by receipt of a unique identifier for the client device; and
    the association of the client device with an audience segment is based on the content category and the unique identifier.

13. The method of claim 5, further comprising:
    determining with the universal data agent whether a publisher of the website is a data provider; and
    collecting visitor data responsive to determination that the publisher is a data provider.

14. The method of claim 13, further comprising:
determining with the universal data agent whether a publisher of the website is an inventory provider; and
delivering ads to the client device responsive to determination that the publisher is an inventory provider.

15. The method of claim 5, further comprising:
determining with the universal data agent whether a publisher of the website is an inventory provider; and
delivering ads to the client device responsive to determination that the publisher is an inventory provider.

16. The method of claim 1 wherein:
the receipt of an indication of a content category for content transmitted to the client device is accompanied by receipt of a unique identifier for the client device; and
the association of the client device with an audience segment is based on the content category and the unique identifier.

17. The method of claim 2, further comprising:
providing a site identifier in the data tag, wherein the site identifier is associated with a site from which content was transmitted to the client device; and
selecting the rules to be transmitted to the client device based on the site identifier.

18. The method of claim 2, further comprising:
providing a group identifier in the data tag, wherein the group identifier is associated with a group of sites; and
selecting the rules to be transmitted to the client device based on the group identifier.

19. The method of claim 1 wherein:
the receipt of an indication of a content category for content transmitted to the client device is accompanied by receipt of a unique identifier for the client device; and
the association of the client device with an audience segment is based on the content category and the unique identifier.

20. The method of claim 1 further comprising the step of periodically transmitting a current plurality of rules to the client device, which current plurality of rules replace any previously transmitted plurality of rules.

* * * * *